(12) United States Patent
Kim (10) Patent No.: US 11,557,126 B2
(45) Date of Patent: Jan. 17, 2023

(54) DISTANCE MEASURING METHOD AND DEVICE USING IMAGE TRACKING FOR AUTONOMOUS DRIVING

(71) Applicant: VISION GRID, Seoul (KR)

(72) Inventor: Hang Sup Kim, Seoul (KR)

(73) Assignee: VISION GRID, Seoul (KR)

(*) Notice: Subject to any disclaimer, the term of this patent is extended or adjusted under 35 U.S.C. 154(b) by 233 days.

(21) Appl. No.: 17/022,448

(22) Filed: Sep. 16, 2020

(65) Prior Publication Data

US 2022/0019812 A1    Jan. 20, 2022

(30) Foreign Application Priority Data

Jul. 16, 2020  (KR) ........................ 10-2020-0087991

(51) Int. Cl.
*G06V 20/56* (2022.01)
*B60W 40/105* (2012.01)
*B60W 60/00* (2020.01)

(52) U.S. Cl.
CPC .......... *G06V 20/56* (2022.01); *B60W 40/105* (2013.01); *B60W 60/001* (2020.02); *B60W 2420/42* (2013.01); *B60W 2420/62* (2013.01); *B60W 2554/802* (2020.02)

(58) Field of Classification Search
CPC ......... B60W 2420/42; B60W 2420/62; B60W 2554/802; B60W 60/001; B60W 40/105; G06V 20/56; G06V 20/588

USPC .......................................................... 701/23
See application file for complete search history.

(56) References Cited

U.S. PATENT DOCUMENTS

| | | | |
|---|---|---|---|
| 11,485,517 B1* | 11/2022 | Wiegman | H02J 7/00712 |
| 2017/0261332 A1* | 9/2017 | Ko | G06T 7/73 |
| 2019/0286153 A1* | 9/2019 | Rankawat | G06V 20/58 |
| 2019/0332120 A1* | 10/2019 | Choi | G01C 21/3848 |
| 2019/0384303 A1* | 12/2019 | Muller | G01S 7/417 |
| 2020/0150235 A1* | 5/2020 | Beijbom | G01C 21/3804 |
| 2020/0181879 A1* | 6/2020 | Halder | E02F 9/262 |
| 2020/0208991 A1* | 7/2020 | Chen | G01C 21/3819 |
| 2020/0209864 A1* | 7/2020 | Chen | G08G 1/0112 |
| 2020/0209873 A1* | 7/2020 | Chen | G01C 21/3822 |
| 2020/0210726 A1* | 7/2020 | Yang | G06V 10/454 |
| 2020/0211370 A1* | 7/2020 | Chen | G01C 21/3889 |
| 2020/0211377 A1* | 7/2020 | Chen | G08G 1/0133 |
| 2020/0218979 A1* | 7/2020 | Kwon | G06V 10/763 |
| 2020/0219264 A1* | 7/2020 | Brunner | G01S 7/4802 |
| 2022/0317300 A1* | 10/2022 | Stenson | G06V 10/751 |

FOREIGN PATENT DOCUMENTS

| | | | | |
|---|---|---|---|---|
| KR | 10-2019-0048952 A | | 5/2019 | |
| WO | WO-2020140049 A1 * | | 7/2020 | G06K 9/00805 |

\* cited by examiner

*Primary Examiner* — Atul Trivedi (57) ABSTRACT

A distance measuring method and device using image tracking for autonomous driving are proposed. The distance measuring method using image tracking for autonomous driving performed in a computing device includes recognizing a grid matching part marked on a road photographed by a camera; generating a virtual grid applied to the road using the grid matching part; and calculating a distance to a target object using the virtual grid.

12 Claims, 5 Drawing Sheets

DISTANCE MEASURING METHOD AND DEVICE USING IMAGE TRACKING FOR AUTONOMOUS DRIVING

CROSS-REFERENCE TO RELATED APPLICATION

This application claims priority under 35 U.S.C. § 119(a) to the Korean Patent Application No. 10-2020-0087991, filed on Jul. 16, 2020, the entire contents of which are incorporated herein by reference.

BACKGROUND

(a) Technical Field

The present disclosure relates to a distance measuring method and device using image tracking for autonomous driving.

(b) BACKGROUND ART

Distance measuring technology is important for the autonomous driving of a vehicle. That is, the measurement of a distance, such as a distance to a vehicle positioned in front, a distance to a next vehicle, or a distance to an obstacle positioned in front, is an important issue for safe autonomous driving.

In the case of measuring a distance with radar or a laser, there is a possibility of interference or confusion as the number of vehicles increases. Furthermore, in the case of installing a sensor on a road, there is a problem that construction cost increases.

Therefore, as a method for measuring a distance in an individual vehicle, there is a method of painting a road like a checkerboard but this incurs excessive Cost.

Furthermore, if a line is drawn on the road separately from a lane, this also incurs excessive cost.

SUMMARY OF THE DISCLOSURE

The present disclosure has been made to solve the above-mentioned problems and proposes a distance measuring method and device using image tracking for autonomous driving, capable of increasing the accuracy of distance measurement while minimizing construction cost.

Other objects of the present disclosure will become more apparent through a preferred embodiment that will be described below.

According to an aspect of the disclosure, the present disclosure provides a distance measuring method using image tracking for autonomous driving performed in a computing device, the method including recognizing a grid matching part marked on a road photographed by a camera; generating a virtual grid applied to the road using the grid matching part; and calculating a distance to a target object using the virtual grid.

In an embodiment, a plurality of grid matching parts may be recognized, an average value for intervals of respective grid matching parts on a screen may be calculated, and the virtual grid may be generated using the calculated average value.

In an embodiment, a second grid matching part having a different distance may be further recognized, and the second grid matching part may be used to generate the virtual grid.

In an embodiment, the distance measuring method may include calculating a vehicle speed using a virtual grid, and comparing the vehicle speed with information about a speed measured in the vehicle itself; and correcting the virtual grid according to a comparison result.

In an embodiment, the distance measuring method may further include recognizing a laser grid emitted by a laser emission module in an image photographed by the camera, and storing a ratio value of the laser grid to the grid matching part. When the grid matching part is not present on the road or is not recognized, the virtual grid may be generated using the laser grid and the ratio value.

According to an aspect of the disclosure, the present disclosure provides a distance measuring device using image tracking for autonomous driving, the device including a processor; and a memory connected to the processor, wherein the memory may store program commands that may be executed by the processor so as to recognize a grid matching part marked on a road photographed by a camera, generate a virtual grid applied to the road using the grid matching part, and calculate a distance to a target object using the virtual grid.

The memory may further store program commands that may be executed by the processor so as to calculate a vehicle speed using the virtual grid, compare the vehicle speed with information about a speed measured in the vehicle itself, and correct the virtual grid according to the comparison result.

The distance measuring device may further include a laser emission module configured to emit a laser grid to the road, wherein the memory may further store program commands that may be executed by the processor so as to further recognize the laser grid in an image photographed by the camera, store a ratio value of the laser grid to the grid matching part, and generate the virtual grid using the laser grid and the ratio value, when the grid matching part is not present on the road or is not recognized.

According to the present disclosure, it is possible to measure a precise distance only with an image captured by a camera in a vehicle by merely making a simple mark on a road, so that an operation can be stably performed regardless of the number of vehicles on the road and construction cost can be reduced.

Furthermore, effects of the present disclosure are not limited to the above-described effects, and it should be understood as including all effects deducible from the configuration of the present disclosure described in the detailed description or claims of the disclosure.

DETAILED DESCRIPTION

Since the present disclosure may be embodied in many different forms, exemplary embodiments will be illustrated in the drawings and described in detail in the detailed description. However, it is to be understood that the present disclosure is not limited to those exemplary embodiments, and the present disclosure is intended to cover all changes, equivalents, and substitutes that fall within the spirit and scope of the present disclosure.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

It will be understood that, although the terms "first", "second", etc. may be used herein to describe various elements, these elements should not be limited by these terms. These terms are only used to distinguish one element from another element. For instance, the terms "a first threshold value" and "a second threshold value" discussed below may be defined as threshold values that are substantially different from each other or are partially equal to each other. However, since there is a possibility of confusion when expressed as the threshold values, the terms "first" and "second" will be used together for the convenience of classification.

The terminology used herein is for the purpose of describing particular embodiments only and is not intended to limit the present disclosure. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Furthermore, components of an embodiment described with reference to each drawing are not limited to only the corresponding embodiment. They may be implemented to be included in other embodiments within the technical spirit of the present disclosure. Furthermore, a plurality of embodiments may be implemented as one integrated embodiment, even if a separate description is omitted.

Furthermore, when the present disclosure is described with reference to the accompanying drawings, like reference numerals refer to like components throughout various figures of the present disclosure, and a duplicated description of the same components will be omitted. In the description of the present disclosure, if it is determined that a detailed description of the related art unnecessarily obscures the gist of the present disclosure, a detailed description thereof will be omitted.

Figure 1:
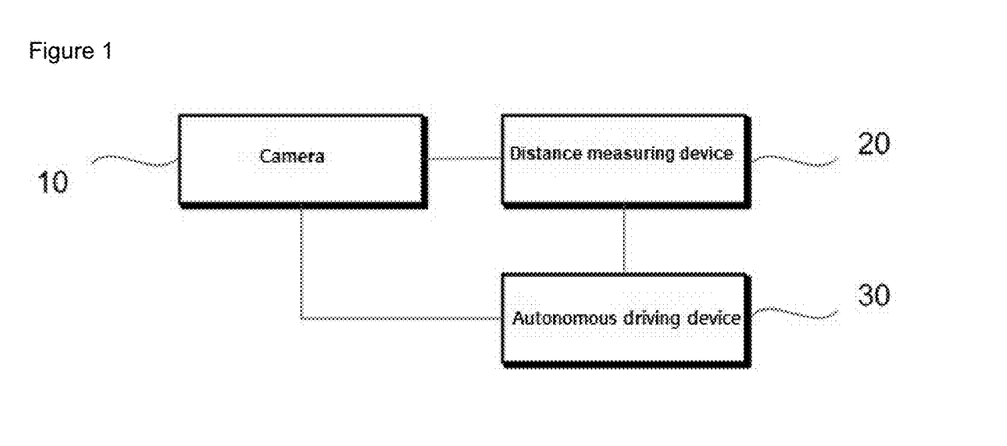
FIG. 1 is a block diagram illustrating the schematic configuration of an autonomous driving system having the function of a distance measuring device using image tracking in accordance with an embodiment of the present disclosure.

FIG. 1 is a block diagram illustrating the schematic configuration of an autonomous driving system having the function of a distance measuring device using image tracking in accordance with an embodiment of the present disclosure.

As shown in FIG. 1, an entire system according to this embodiment includes a camera 10, a distance measuring device 20, and an autonomous driving device 30.

The camera 10 photographs a road area. The camera 10 may be installed at various positions including a front, a rear, or a side of a vehicle (host vehicle). Hereinafter, for the convenience of description, a case where the camera 10 is installed at the front of the vehicle to measure a distance to a front vehicle will be described. Of course, the present disclosure is not limited thereto, but the camera may be configured to measure a distance to a rear vehicle or a next vehicle.

The distance measuring device 20 is provided with a memory and a processor as a computing device to analyze an image photographed by the camera 10 and thereby measure a distance to a target object (e.g. a front vehicle). The processor may include a central processing unit (CPU) that may execute a computer program or other virtual machines, and the memory may include a non-volatile storage device such as a fixed hard drive or a removable storage device. The removable storage device may include a compact flash unit, an USB memory stick, etc. The memory may also include a volatile memory such as various kinds of random access memories. Program commands that may be executed by the processor are stored in such a memory. In other words, the program commands executed by the processor are stored in the memory to perform a distance measuring function using the image photographed by the camera 10, which will be described below in detail.

The autonomous driving device 30 uses a distance value measured by the distance measuring device 20 for the autonomous driving. Since the present disclosure is directed to distance measurement, the description of the autonomous driving function itself will be omitted. However, the distance measuring device 20 is not necessarily used for only the autonomous driving as in this embodiment, but may be used in all fields in which the vehicle should measure a distance to the target object.

As the method of measuring the distance using the image in the distance measuring device 20, a mark (hereinafter referred to as a grid matching part) that may recognize a distance on the road is used. Hereinafter, this will be described in detail with reference to the drawings.

Figure 2:
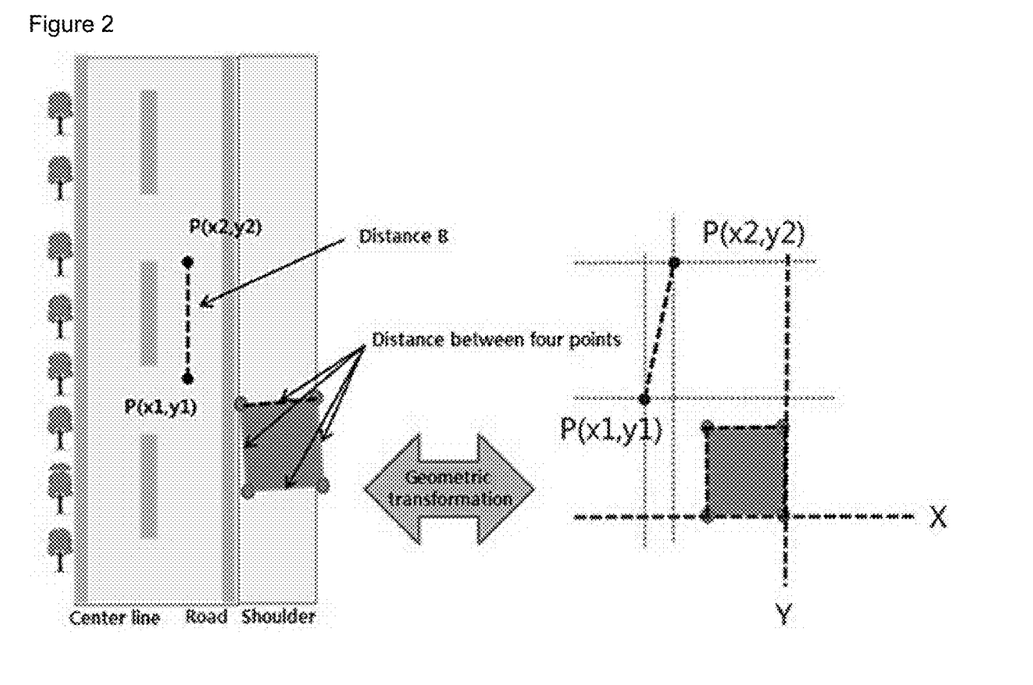
FIG. 2 is a diagram illustrating the measurement of a distance using a grid matching part in accordance with an embodiment of the present disclosure.
Figure 3:
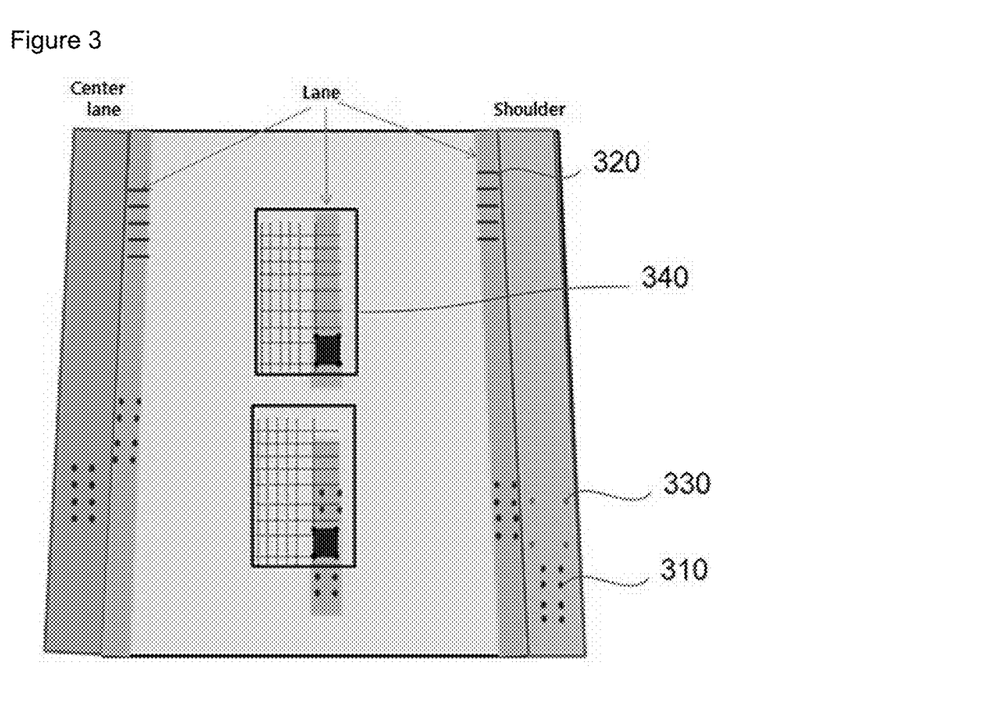
FIG. 3 is a diagram illustrating various grid matching parts in accordance with an embodiment of the present disclosure.

FIG. 2 is a diagram illustrating the measurement of a distance using the grid matching part in accordance with an embodiment of the present disclosure, and FIG. 3 is a diagram illustrating various grid matching parts in accordance with an embodiment of the present disclosure.

First, referring to FIG. 2, if a rectangular grid matching part is installed on the road, an actual distance between two different points may be measured by perspective transformation. In this case, a distance between respective points of the rectangular grid matching part may be previously standardized, for example, 20 to 40 cm, and a virtual grid is generated through the rectangular grid matching part.

If the grid matching parts are marked at various positions as shown in FIG. 3 to generate the virtual grids, it is possible to measure a distance to the target object based on a coordinate using each virtual grid in the vehicle.

For instance, the grid matching part may be formed of four points to have a rectangular shape as denoted by reference numeral 310, or may be expressed to have the same shape as denoted by reference numeral 330 but a different standard, or may be formed of continuous line segments instead of points as denoted by reference numeral 320.

Such a grid matching part may be marked on a lane, a shoulder, or a center, or may be formed as a model that may be recognized as an image by the camera, or may be implemented by a structure or painting (paint).

A process of measuring a distance using the grid matching part on the road will be described.

Figure 4:
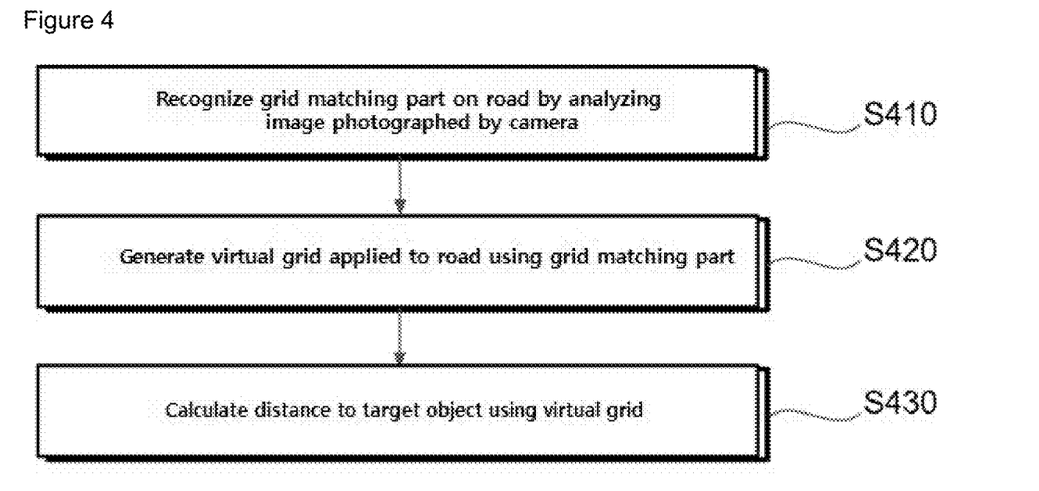
FIG. 4 is a flowchart illustrating a distance measuring process using image tracking for autonomous driving in accordance with an embodiment of the present disclosure.

FIG. 4 is a flowchart illustrating a distance measuring process using image tracking for autonomous driving in accordance with an embodiment of the present disclosure.

Referring to FIG. 4, the distance measuring device 20 recognizes the grid matching part marked on the road photographed by the camera (S410), generates the virtual grid 340 (see FIG. 3) applied to the road using the grid matching part (S420), and calculates a distance to the target object using the virtual grid (S430).

For example, a virtual grid in which the same grid as the grid matching part is connected to the target object is created in the image of the camera. When the number of grids to the target object is ten, the distance to the target object is measured to be 4 m, assuming that the distance of the grid matching part is 40 cm.

Here, as described above, since the grid matching part may be formed in a plurality of parts or in a plural form, the distance measuring device 20 may recognize a plurality of grid matching parts, calculate an average value for intervals of respective grid matching parts on a screen, and generate a virtual grid using the calculated average value. In other words, it is possible to increase accuracy by using the plurality of grid matching parts.

Furthermore, a second grid matching part having a different distance is further recognized, and the second grid matching part is further used to generate the virtual grid. In other words, it is possible to increase accuracy by using two or more grid matching parts having different distances together.

For instance, if it is possible to recognize the distance by the virtual grid and to know a time interval of a photographed image frame of the camera, a vehicle speed may be measured based on a fixed specific object (e.g. a road sign, a direction indicating line on the road, etc.) visible from the image. By correcting the virtual grid using speed information, the distance may be more precisely measured.

Figure 5:
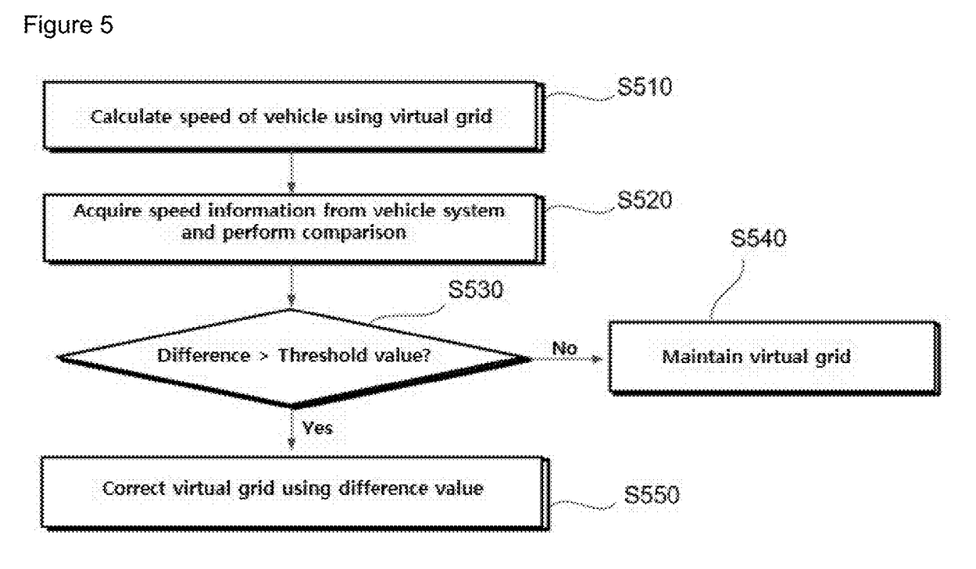
FIG. 5 is a flowchart illustrating a virtual-grid correcting process for measuring a distance using a vehicle speed in accordance with an embodiment of the present disclosure.

FIG. 5 is a flowchart illustrating a virtual-grid correcting process for measuring a distance using a vehicle speed in accordance with an embodiment of the present disclosure.

Referring to FIG. 5, the virtual grid and the image photographed by the camera 10 are analyzed to calculate the moving speed of the vehicle (S510).

Furthermore, speed information (e.g. speed information measured by the rolling of wheels, speed information measured by a navigation system, etc.) is acquired from a vehicle system, and then is compared with the calculated moving speed (S520).

According to the compared result, it is determined whether the difference exceeds a preset threshold value (e.g., 3 km/h) (S530). A large difference means that speed measurement using the virtual grid is somewhat inaccurate, which may be interpreted that there are many errors in the distance of the virtual grid.

Therefore, when the difference is equal to or less than a threshold value, the virtual grid is maintained (S540). When the difference is large to exceed the threshold value, the virtual grid is corrected using a difference value (S550).

For example, when the calculated moving speed is higher than speed of the acquired information (to exceed the threshold value), the interval of the virtual grid is somewhat increased to reduce the moving speed.

When the grid matching part is not marked on the road or in the case of dark night, it is difficult to recognize the grid matching part. In this case, it is possible to use a method where the vehicle itself marks the grid matching part on the road.

Figure 6:
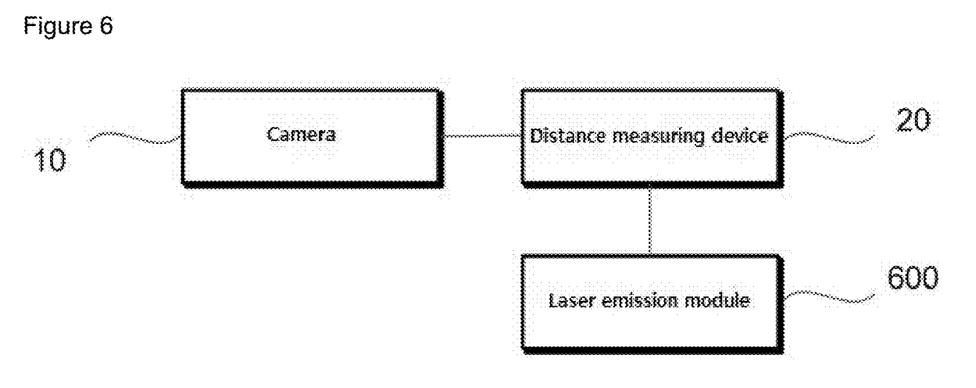
FIG. 6 is a diagram illustrating the configuration of a distance measuring system in accordance with an embodiment of the present disclosure.
Figure 7:
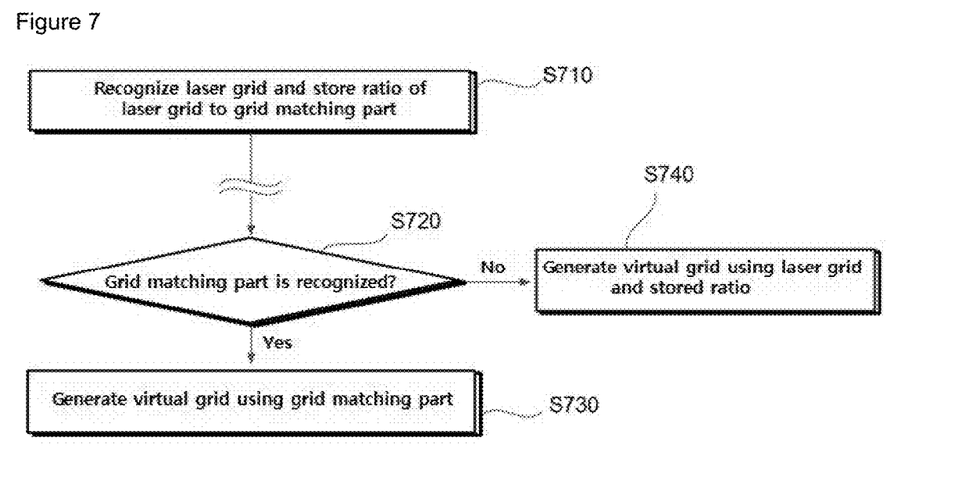
FIG. 7 is a flowchart illustrating a virtual-grid generating process in accordance with an embodiment of the present disclosure.

FIG. 6 is a diagram illustrating the configuration of a distance measuring system in accordance with an embodiment of the present disclosure, and FIG. 7 is a flowchart illustrating a virtual-grid generating process in accordance with an embodiment of the present disclosure.

Referring to FIG. 6, the distance measuring device 20 further includes a laser emission module 600 that emits laser (grid-shaped laser, hereinafter referred to as a laser grid) to an outside of the vehicle. As shown in the drawing, the laser emission module may be provided as a separate device or implemented as a component of the distance measuring device 20. Hereinafter, a configuration where the distance measuring device 20 is provided with the laser emission module 600 will be mainly described.

Referring to FIG. 7, the distance measuring device 20 further recognizes the laser grid in the image photographed by the camera, and calculates and stores a ratio value of the laser grid to the grid matching part (S710). Since the vehicle body of every vehicle has a different height and thus the size of the laser grid emitted to the road may vary, a ratio of the laser grid to the size of the grid matching part photographed on an actual road is calculated and stored.

Subsequently, it is determined whether the grid matching part is recognized on the road (S720). When the grid matching part is recognized, the virtual grid is generated using the grid matching part (S730).

On the other hand, when the grid matching part is not present on the road or is not recognized because it is at night, the laser grid is emitted, and the virtual grid is generated using the stored ratio value and the laser grid of the photographed image (S740).

In the foregoing, it has been described that the virtual grid is generated using the ratio of the laser grid to the physical grid matching part. However, without being limited thereto, considering that it is at night, four points may be generated on the road using the laser or other light sources in the vehicle or an external road facility, and the above-described four points may be recognized as the grid matching part by the distance measuring device 20 to generate the virtual grid.

Even when rectangular vertices are formed through the laser or the like, the distance to each point may be preset to 20 or 40 cm, for example, in view of a distance between the laser emission module and a road surface. The vehicle may recognize this, so that the virtual grid having a uniform distance may be generated.

In the case of recognizing the grid matching part, the virtual grid according to this embodiment may be automatically generated, and may be generated by photographing an actual grid and loading stored information.

In the case of using the actual grid, the camera is installed at a predetermined position to photograph a grid-shaped ground positioned in front.

A grid image is identified in the photographed image, and a grid coordinate is extracted from the identified grid image and stored in a database.

The database (grid-information storage part) stores information about a lens type of the camera photographing the actual grid image, a height, a distance to the grid, and a grid cell size.

In detail, the grid-information storage part stores a grid identification number, coordinate information of an individual grid cell, a left top/right top/left bottom/right bottom screen coordinate, and a left top/right top/left bottom/right bottom transformation original coordinate.

Here, the left top/right top/left bottom/right bottom transformation original coordinate is defined as a coordinate when changed into an actual distance.

According to this embodiment, a curved virtual grid may be generated according to the shape of the road. In the case of the curved grid, the grid-information storage part may store curvature information of top/bottom/left/right.

Furthermore, the length of an upper side and the length of a lower side of the actual individual grid cell reflecting a curve may also be stored.

In order to generate the virtual grid reflecting the curvature of the road, it is possible to calculate lateral/longitudinal curvature using the lane on the road or facilities on a crosswalk, a sidewalk block, or other roads and thereby to generate a curved virtual grid.

Since information having various parameters about the camera is stored, a corresponding grid is extracted according to the type or installation position of the camera installed in the actual road.

According to this embodiment, the actually photographed grid may have various shapes and curvatures, and may store GPS information matching therewith.

Thereby, if the grid matching part is recognized during autonomous driving, the virtual grid matching optimally with the direction of the recognized grid matching part, the curvature of the road, and the GPS information of the road may be loaded and used to measure a distance.

In order to reflect the curvature of the actual road, a road-surface scan device having a wheel-shaped sensor may be used.

According to this embodiment, the individual grid cell of the actually photographed grid may have various sizes and curvatures. In the case of recognizing the grid matching part, the distance measuring device 20 may generate the virtual grid through a grid corresponding to the actual road, considering the size of the recognized grid matching part and a current road environment.

Figure 8:
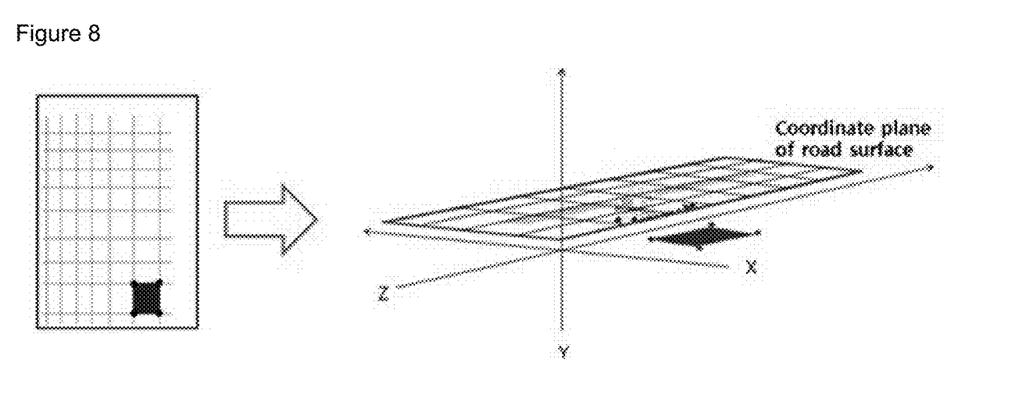
FIG. 8 is a diagram illustrating a process of geometrically transforming a reference grid to be fit for road environment.

The virtual grid according to this embodiment may be generated by geometrically changing a reference grid according to the road environment, as shown in FIG. 8. This may be defined as a process of transforming the gird into a homogeneous coordinate system.

As such, the method of measuring the distance between vehicles based on the coordinate using the virtual grid is advantageous in that visual identification is easy and an error is greatly reduced.

Furthermore, since the virtual grid is generated using the rectangular grid matching part with a known standard, and the coordinate and the distance are measured by the virtual grid, an error of a distance measured by a 3D camera installed in the vehicle may be reduced.

According to this embodiment, the distance measuring device 20 detects a target object from the photographed image, and measures a distance between the host vehicle and the target object based on the coordinate using the virtual grid generated in this manner.

For example, the target object may be a vehicle moving in a straight line or in a curved line (turning to the left/right) in front. Here, the target object may be detected by detecting a shadow in consideration of the characteristics of the vehicle.

For example, in the case of a front vehicle in daytime, the darkest shadow is formed at the bottom of a rear wheel. This portion is determined as the position of the target object to measure a distance between the host vehicle and the target object.

In addition, even in the case of a person or a two-wheeled vehicle, a distance may be measured by tracking an outline trajectory of a ground contact surface of the object on the road.

At night, the position of the target object may be determined through headlights or taillights.

When the position of the target object is determined and thus a coordinate on the virtual grid of the target object is obtained, the direction and distance of the host vehicle and a surrounding vehicle may be obtained based on the grid coordinate, and a point where the camera is installed in the vehicle, the size of the host vehicle, and corners of the vehicle may be set as the reference of the coordinate of the virtual grid. The distance and direction between coordinates of the corners and corners of the surrounding vehicle may be obtained.

The basic formula for obtaining the distance and direction between coordinates based on the virtual grid coordinate is as follows.

When a vehicle in front moves in a straight line, equation for calculating the distance is $\sqrt{(x2-x1)^2+(y2-y1)^2+(z2-z1)^2}$, assuming that a reference coordinate on a three dimension which is converted into the actual distance of the host vehicle is (x1,y1,z1), and a reference coordinate which is converted into the actual distance of the surrounding vehicle is (x2,y2,z2).

At this time, since two vehicles are generally at the same height (y-axis), $(y2-y1)^2$ may be ignored, but the height (y-axis) should be reflected on a sloped road.

Equation for calculating an angle with the surrounding vehicle is as follows: $\theta=\tan-1((z2-z1)/(x2-x1))$.

Here, a relative vehicle speed may be calculated by the above-described distance equation using a previous position (xp2, yp2, zp2) and a current position (x2, y2, z2).

Figure 9:
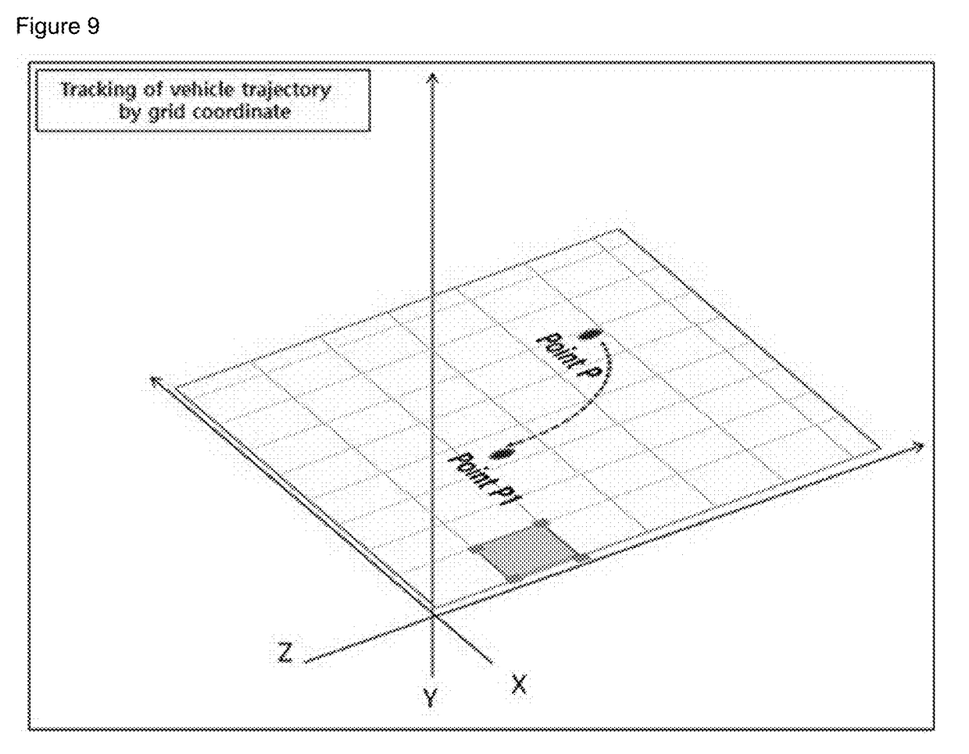
FIG. 9 is a diagram illustrating a process of measuring a distance to a vehicle turning leftwards or rightwards.

When a vehicle turns to the left or right at an intersection and is driven in a curved line, the moving direction of the vehicle forms a curved trajectory, so that a trajectory may be tracked using various types of curve detection algorithms such as Bezier curve, arc curve, or elliptic curve, and a moving distance may be calculated in a corresponding coordinate using the coordinate based on the virtual grid as shown in FIG. 9.

The distance measuring method using the image tracking for the autonomous driving according to the present disclosure may be implemented with a computer-readable code on a computer-readable recording medium. The computer-readable recording medium includes all types of recording media in which data read by a computer system is stored. Examples of the recording media may include Read Only Memories (ROM), Random Access Memories (RAM), magnetic tape, magnetic disks, flash memories, optical-data storage devices, etc. Furthermore, the computer-readable recording medium may be stored and executed as a code that is distributed in a computer system connected via a computer communication network and is read in a distributed manner.

Although the present disclosure was described with reference to specific embodiments shown in the drawings, it is apparent to those skilled in the art that the present disclosure may be changed and modified in various ways without departing from the scope of the present disclosure.

What is claimed is:

1. A distance measuring method using image tracking for autonomous driving performed in a computing device, the method comprising:
   recognizing a grid matching part marked on a road photographed by a camera;
   generating a virtual grid applied to the road using the grid matching part; and
   calculating a distance to a target object using the virtual grid,
   wherein a plurality of grid matching parts is recognized, an average value for intervals of respective grid matching parts on a screen is calculated, and the virtual grid is generated using the calculated average value.

2. The distance measuring method of claim 1,
   wherein the grid matching part is marked on a lane, a shoulder, or a center of the road, and
   wherein the grid matching part is formed as a model that is recognized as an image by the camera or is implemented by a structure or a painting.

3. The distance measuring method of claim 2, wherein the grid matching part is formed of four points or continuous line segments to have a rectangular shape.

4. The distance measuring method of claim 1, wherein a second grid matching part having a different distance is further recognized, and the second grid matching part is further used to generate the virtual grid.

5. The distance measuring method of claim 1, further comprising:
   calculating a vehicle speed using the virtual grid, and comparing the vehicle speed with information about a speed measured in the vehicle itself; and
   correcting the virtual grid according to the comparison result.

6. The distance measuring method of claim 1, further comprising:
   further recognizing a laser grid emitted by a laser emission module in an image photographed by the camera, and storing a ratio value of the laser grid to the grid matching part,
   wherein, when the grid matching part is not present on the road or is not recognized, the virtual grid is generated using the laser grid and the ratio value.

7. The distance measuring method of claim 1,
   wherein a gid coordinate is extracted from a gird image identified in the photographed image and is stored in a grid information storage part, and
   wherein the grid information storage part stores information about a lens type of the camera photographing the gird image, a height, a distance to a grid, and a gird cell size.

8. The distance measuring method of claim 7, wherein the grid information storage part stores a grid identification number, coordinate information of an individual grid cell, a left top/right top/left bottom/right bottom screen coordinate, and a left top/right top/left bottom/right bottom transformation original coordinate.

9. The distance measuring method of claim 8,
   wherein the grid information storage part stores curvature information of top/bottom/left/right of the road and the length of an upper side and a lower side of the actual individual grid cell,
   wherein the virtual grid reflecting the curvature of the road is generated by calculating lateral/longitudinal curvature using the lane on the road, facilities on a crosswalk, a sidewalk block, or other roads.

10. A distance measuring device using image tracking for autonomous driving, the device comprising:
    a processor; and
    a memory connected to the processor,
    wherein the memory stores program commands that may be executed by the processor so as to recognize a grid matching part marked on a road photographed by a camera, generate a virtual grid applied to the road using the grid matching part, and calculate a distance to a target object using the virtual grid, and
    wherein a plurality of grid matching parts is recognized, an average value for intervals of respective grid matching parts on a screen is calculated, and the virtual grid is generated using the calculated average value.

11. The distance measuring device of claim 10, wherein the memory further stores program commands that may be executed by the processor so as to calculate a vehicle speed using the virtual grid, compare the vehicle speed with information about a speed measured in the vehicle itself, and correct the virtual grid according to the comparison result.

12. The distance measuring device of claim 11, further comprising:
    a laser emission module configured to emit a laser grid to the road,
    wherein the memory further stores program commands that may be executed by the processor so as to further recognize the laser grid in an image photographed by the camera, store a ratio value of the laser grid to the grid matching part, and generate the virtual grid using the laser grid and the ratio value, when the grid matching part is not present on the road or is not recognized.

* * * * *